United States Patent
Willinger et al.

(10) Patent No.: US 11,872,659 B2
(45) Date of Patent: Jan. 16, 2024

(54) WELDING DEVICE AND WELDING METHOD WITH SELF-SETTING WELDING WIRE FEED SPEED

(71) Applicant: FRONIUS INTERNATIONAL GMBH, Pettenbach (AT)

(72) Inventors: Martin Willinger, Pettenbach (AT); Josef Artelsmair, Pettenbach (AT); Peter Lattner, Pettenbach (AT); Wolfgang Kruglhuber, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 0 days.

(21) Appl. No.: 17/276,603

(22) PCT Filed: Sep. 16, 2019

(86) PCT No.: PCT/EP2019/074662
§ 371 (c)(1),
(2) Date: Mar. 16, 2021

(87) PCT Pub. No.: WO2020/058169
PCT Pub. Date: Mar. 26, 2020

(65) Prior Publication Data
US 2021/0354228 A1    Nov. 18, 2021

(30) Foreign Application Priority Data
Sep. 17, 2018   (EP) .................................. 18194863

(51) Int. Cl.
*B23K 9/12*   (2006.01)
*B23K 9/095*  (2006.01)

(52) U.S. Cl.
CPC ............ *B23K 9/125* (2013.01); *B23K 9/0956* (2013.01); *B23K 9/126* (2013.01)

(58) Field of Classification Search
CPC ....... B23K 9/125; B23K 9/0956; B23K 9/126
(Continued)

(56) References Cited

U.S. PATENT DOCUMENTS 1,975,805 A * 10/1934 Smith ........................ A61L 2/02
                                                              43/900
4,088,866 A *  5/1978 Lund ..................... B23K 9/1735
                                                              219/137 R
(Continued)

FOREIGN PATENT DOCUMENTS

CN    107042351 A  *  8/2017 ............. B23K 9/124
EP     2669037 A1  * 12/2013 ............. B23K 9/073
(Continued)

OTHER PUBLICATIONS

Int'l Search Report (Form PCT/ISA/210) conducted in Int'l Appln. No. PCT/EP2019/074662 (dated Jan. 8, 2020), w/ translation.
(Continued)

*Primary Examiner* — Nathaniel E Wiehe
*Assistant Examiner* — Ket D Dang
(74) *Attorney, Agent, or Firm* — GREENBLUM & BERNSTEIN, P.L.C.

(57) ABSTRACT

In order to easily regulate the supply of welding wire to the welding point during a welding process, the electrical potential produced by the welding current around the electrode is tapped with the welding wire and the control of the welding wire feed speed is carried out on the basis of the tapped potential and this control results in an average welding wire feed speed being established.

23 Claims, 5 Drawing Sheets

(58) Field of Classification Search
USPC ......... 219/124.02, 130.1, 136, 137.7, 137 R, 219/137 PS, 131 F, 130; 314/52, 62
See application file for complete search history.

(56) References Cited

U.S. PATENT DOCUMENTS

| | | | | |
|---|---|---|---|---|
| 4,247,751 | A * | 1/1981 | Ashton | B23K 9/125 |
| | | | | 219/130.31 |
| 4,319,124 | A * | 3/1982 | Johansson | B23K 9/1056 |
| | | | | 219/130.21 |
| 4,608,481 | A | 8/1986 | Nomura et al. | |
| 6,316,745 | B1 * | 11/2001 | Karlsson | B23K 9/0673 |
| | | | | 219/130.31 |
| 7,767,933 | B2 * | 8/2010 | Matus | B23K 9/1006 |
| | | | | 219/130.1 |
| 2003/0038156 | A1 * | 2/2003 | Artelsmair | B23K 9/126 |
| | | | | 228/102 |
| 2011/0297658 | A1 * | 12/2011 | Peters | B23K 9/04 |
| | | | | 219/162 |
| 2012/0074114 | A1 * | 3/2012 | Kawamoto | B23K 9/09 |
| | | | | 219/130.21 |
| 2013/0327749 | A1 * | 12/2013 | Denney | B23K 35/0261 |
| | | | | 219/137 PS |
| 2014/0116994 | A1 * | 5/2014 | Peters | B23K 9/04 |
| | | | | 219/76.14 |
| 2015/0158107 | A1 * | 6/2015 | Latessa | B23K 9/125 |
| | | | | 219/121.63 |
| 2015/0165540 | A1 * | 6/2015 | Cole | B23K 9/0213 |
| | | | | 219/76.14 |
| 2015/0375331 | A1 * | 12/2015 | Hutchison | B23K 9/125 |
| | | | | 219/137 R |

FOREIGN PATENT DOCUMENTS

| | | |
|---|---|---|
| JP | 55-8352 A | 1/1980 |
| JP | 58-86982 | 5/1983 |
| JP | 60-36860 B2 | 2/1985 |
| JP | 60-036860 | 8/1985 |
| JP | 60-250877 A | 12/1985 |
| JP | 6-31447 A | 2/1994 |
| JP | 2506790 B2 | 6/1996 |
| JP | 8-309536 | 11/1996 |
| JP | 9-141432 | 6/1997 |
| JP | 2015-71178 A | 4/2015 |
| WO | 2010/082081 | 7/2010 |

OTHER PUBLICATIONS

Int'l Written Opinion Report (Form PCT/ISA/237) conducted in Int'l Appln. No. PCT/EP2019/074662 (dated Jan. 8, 2020), w/ translation.

Office action, dated Oct. 20, 2021, of Japanese Patent Application No. 2021-514366, with English language translation.

* cited by examiner

WELDING DEVICE AND WELDING METHOD WITH SELF-SETTING WELDING WIRE FEED SPEED

BACKGROUND

I. Field of the Invention

The present invention relates to a welding method and to a welding device comprising a welding torch having an electrode and a welding wire which is supplied to a welding point at a welding wire feed speed, whereby, for welding, a welding current flowing through the electrode causes an arc to be maintained between the electrode and a workpiece to be welded.

The invention relates to welding method using an electrode. A welding current is passed through the electrode in order to establish and maintain an arc between the electrode and a workpiece to be welded. The arc melts the material of the workpiece in a weld pool. In the case of a consumable electrode, the electrode also melts, and the consumable electrode is supplied in a known manner. A filler material is held in the form of a welding wire (with any desired cross section) in the arc or the weld pool, as a result of which the filler material also melts and combines with the material of the workpiece in the weld pool. An inert shielding gas (usually argon or helium) is usually also used to prevent the melt from coming into contact with the ambient air. In addition, an electrical heating current can also be introduced into the welding wire in order to electrically heat the welding wire and to assist in the melting of the filler material. A known welding method of this type is TIG welding (tungsten inert gas welding), with a non-consumable electrode made of tungsten or a tungsten alloy, or MIG welding (metal inert gas welding) or MAG welding (metal active gas welding), each with a consumable electrode.

2. Description of the Background

In such a welding method, the welding wire is often supplied to the welding point with a wire feed. In this process, a constant wire feed speed is normally set on the basis of the set welding current level. It often happens here that the welding wire dips too deeply into the weld pool or that the welding wire loses contact with the weld pool and moves too far away from the weld pool. In both cases, this worsens the welding result and can lead to uneven weld seams or defects in the weld seam. This occurs especially when the welding torch is guided manually, in which case the distance between the welding torch and the workpiece cannot be precisely maintained. However, this can also occur with robot-guided welding torches, for example when welding more complex geometries and/or with different welding speeds.

In order to eliminate this problem, it has already become known from WO 2010/082081 A1 to use the heating current through the welding wire in order to detect the change in voltage between the welding wire and the workpiece. If the change in voltage exceeds a specified limit value, the heating current is reduced to a very small value for a defined period of time in order to prevent the welding wire from melting quickly. With the remaining small heating current, the renewed contact of the welding wire with the workpiece (more precisely with the weld pool) is detected. Such contact causes a short circuit, as a result of which the voltage between the welding wire and the workpiece drops to zero. If renewed contact is identified, the heating current through the welding wire is increased again. This method can thus only be used for hot wire applications (with additional heating of the welding wire by means of a heating current), but not for cold wire applications (without such a heating current). However, this method will only work well within a narrow range, since the basic problems (the welding wire dipping too deeply into the weld pool, loss of contact between the welding wire and the weld pool) cannot be reliably remedied if the welding wire feed speeds are set incorrectly or unfavorably.

In JP 60-036860 B, the electrical potential that is established around the electrode is evaluated in order to change the position of the welding wire relative to the workpiece. The electrical potential can be measured as voltage between the welding wire and the workpiece and is used to deduce the dipping position of the welding wire into the weld pool. This is used to regulate the position of the welding wire relative to the workpiece, specifically the distance between the welding wire and the workpiece, in order to set an optimum dipping position. This method is based on the fact that there is always contact between the weld pool and the welding wire. However, this means that there is practically always a short circuit between the welding wire and the workpiece, and the detectable voltages are very small and in a very narrow range, which makes the method prone to failure and unreliable. Apart from this, an additional controller and actuator are required to be able to adjust the position of the welding wire relative to the workpiece and also relative to the welding torch.

SUMMARY

It is therefore an object of the present invention to provide a welding method and a corresponding welding device, having an electrode and a filler material in the form of a welding wire, with which the problems associated with the delivery of the welding wire to the weld pool (the welding wire dipping too deeply into the weld pool, the welding wire becoming distanced from the weld pool) can be solved in a simple and robust manner.

This object is achieved according to the invention in that the electrical potential produced by the welding current around the electrode is tapped with the welding wire and the control of the welding wire feed speed is carried out on the basis of the tapped potential and this control results in an average welding wire feed speed being established. The detected potential can be used to directly determine whether the welding wire contacts the weld pool and how far the welding wire is from the weld pool. The potential tapped in this way can thus be used to control the welding wire feed speed in such a way that the welding wire does not dip too deeply into the weld pool and does also not move too far away from the weld pool. The welding wire feed speed thus does not have to be controlled directly, but the position of the welding wire in relation to the weld pool is controlled, and thus indirectly the average welding wire feed speed that is established.

Advantageously, this is done in such a way that the welding wire is supplied to the welding point at a first welding wire feed speed until a short circuit between the welding wire and the workpiece is determined via the tapped potential, and, when the short circuit is detected, the supply of the welding wire to the welding point is stopped or changed to a second welding wire feed speed, and, via the tapped potential and a specified limit value of the potential, it is determined that the stopped welding wire has melted to a certain extent which causes the elimination of the short circuit, whereby the supply of the welding wire to the welding point is restarted at the first welding wire feed speed. This sequence is particularly advantageously repeated cyclically.

Due to the control of the welding wire feed speed via the tapped potential according to the invention, an optimal average welding wire feed speed for the respective welding conditions (e.g., welding current, arc length) is automatically established, which considerably simplifies the supply of the welding wire. At the same time, the fill level of the weld seam also adapts automatically.

Preferably, an electrical voltage or an electrical current with respect to the reference potential of the workpiece, or a related electrical variable, is detected as potential. This makes it easy to identify a short circuit when the electrical voltage or electrical current drops to zero.

In an advantageous and simple embodiment, the start of the welding wire feed is controlled via a specified limit voltage or a specified limit current as a limit value of the potential.

In a particularly advantageous embodiment, the average welding wire feed speed can be used to regulate a distance between the electrode and the workpiece. Since the cycle frequency that is established and the average welding wire feed speed that is established are dependent on the distance, the distance can thus be regulated to a desired value in a simple and robust manner. This is preferably done in such a way that, starting from a desired distance, the distance is increased when the average welding wire feed speed or the cycle frequency decreases and the distance is reduced when the average welding wire feed speed or the cycle frequency increases.

BRIEF DESCRIPTION OF THE DRAWING

The present invention is described in greater detail in the following with reference to FIGS. 1 to 7, which show advantageous embodiments of the invention by way of example, schematically and in a non-limiting manner. In the drawings.

DETAILED DESCRIPTION

Figure 1:
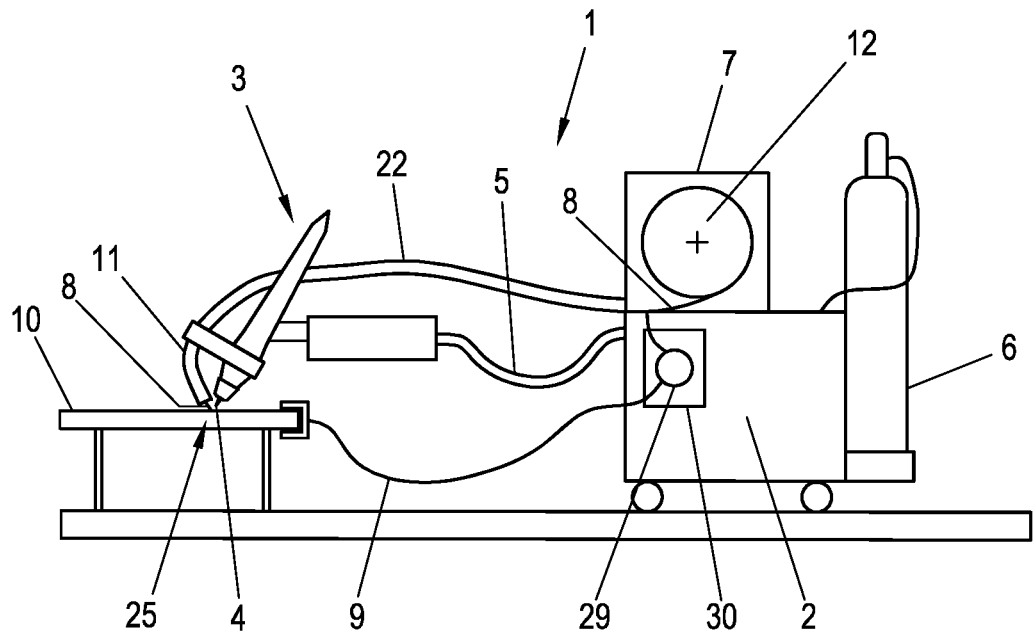
FIG. 1 shows a welding device according to the invention comprising a welding torch with a non-consumable electrode.

FIG. 1 shows a welding device 1, for example a TIG welding device, with a welding power source 2 and a welding torch 3 with a non-consumable electrode 4. The welding torch 3 is connected to the welding power source 2 by means of a hose pack 5. In addition, a shielding gas container 6 is provided. Usual connection fittings on the shielding gas container 6, for example for setting the flow of shielding gas, are not shown. Furthermore, a welding wire feed 7 is provided in order to supply the welding wire 8 as a filler material to the welding point 25. The welding wire feed 7 can be part of the welding power source 2, but can also be designed as an independent unit. In the hose pack 5, all required media, energy and control signals can be transmitted to the welding torch 3, for example electrical energy (current, voltage), cooling medium (if the welding torch 3 is cooled), control lines for controlling the welding process, shielding gas, welding wire. Usually, a hose in which the individual lines and media are guided is provided as the hose pack 5. Of course, a plurality of separate hoses or lines can also be provided. The electrical counter pole (usually the positive pole) contacts the workpiece to be welded 10 via a contact line 9. A welding wire supply 11 can also be arranged on the welding torch 3 in order to be able to supply the welding wire 8 in a desired position and direction to the welding point 25. The welding wire supply 11 can also be connected to a welding wire line 22 in which the welding wire 8 is guided to the welding wire supply 11. However, the welding wire supply 11 does not necessarily have to be arranged on the welding torch 3, but can also be arranged at any other suitable location, for example on a welding robot. The welding wire feed 7 does not necessarily have to be arranged on the welding power source 2 either, but can also be arranged at any other suitable location, for example on a welding robot. In the welding wire feed 7, a welding wire roll 12 is arranged from which the welding wire 8 is unrolled during welding and is supplied to the welding point at a feed speed $v_D$. A corresponding drive for the feed is also implemented for this purpose.

Figure 2:
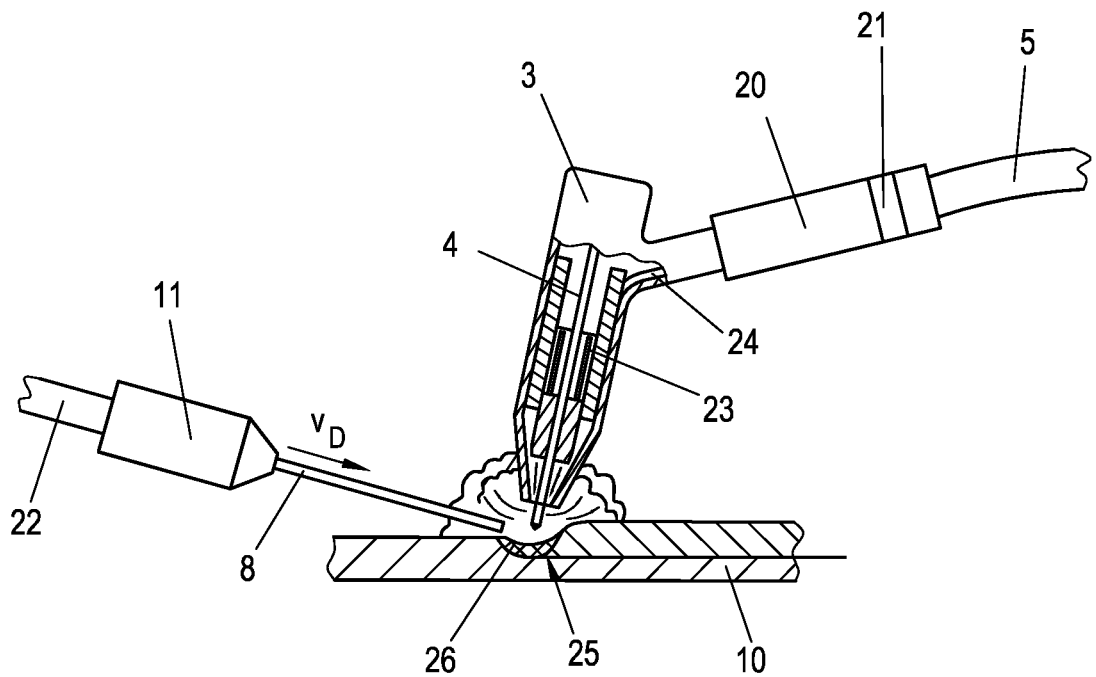
FIG. 2 shows a welding torch with a non-consumable electrode.

FIG. 2 shows the welding torch 3 in detail. The hose pack 5 is connected to the handpiece 20 of the welding torch 3 via a hose pack coupling 21. The welding wire 8 is in this case supplied to the welding wire supply 11, for example via a separate welding wire line 22, from the welding wire feed 7. In the welding torch 3 there is a contact sleeve 23 which surrounds the electrode 4 and makes electrical contact therewith, and which is connected to a welding current line 24 (usually the negative pole). The electrode 4 protrudes from the welding torch 3 at one end of the welding torch 3. Shielding gas can emerge from the welding torch 3 around the electrode 4, surrounding the welding point 25 with the weld pool 26 and shielding it from the ambient atmosphere (as indicated in FIG. 2). The welding wire 8 is supplied to the welding point 25 during welding.

Since the basic structure and the basic function, and the various modifications thereto, of such a welding device 1 are known, they will not be discussed in more detail here.

In the case of a welding method with a consumable electrode, for example in MIG or MAG welding, the above essentially applies analogously, with the consumable electrode in this case being continuously supplied in a known manner.

Figure 3:
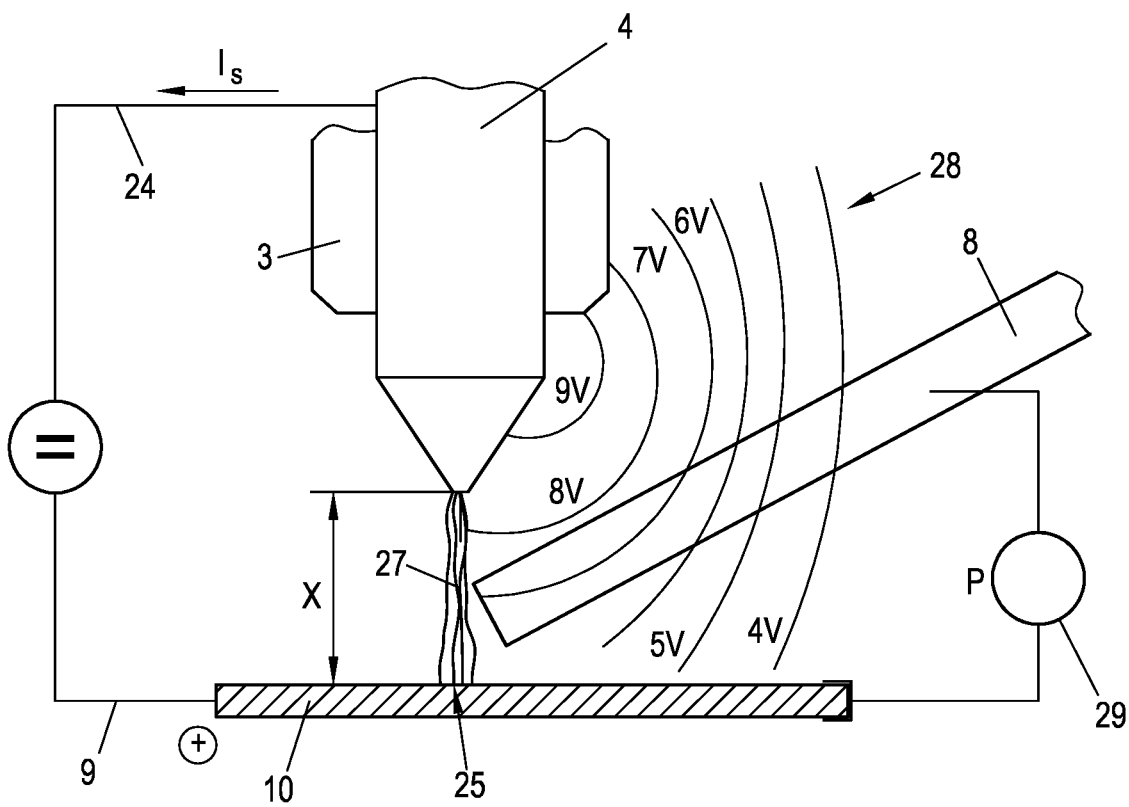
FIG. 3 shows the potential field formed by the welding current in/around the arc (around the non-consumable electrode)

The invention uses the effect known per se that, when a welding current $I_S$ flows through the electrode 4, a quasi-static electrical field is formed around the electrode 4. This quasi-static electrical field leads to a potential distribution in the vicinity of the electrode, as shown in FIG. 3. FIG. 3 shows only the tip of a non-consumable electrode 4 in the welding torch 3. A welding current $I_S$ (e.g., 100 A) is passed through the electrode 4, which leads to or maintains an arc 27 between the electrode 4 and the workpiece 10. Known methods can be used to ignite the arc 27, for example high-frequency ignition or ignition by touching the workpiece 10 with the electrode 4 and then lifting off the electrode 4. A potential distribution is formed around the electrode 4, as indicated by way of example in FIG. 3 by equipotential lines 28. In principle, the values are dependent on, amongst other things, the welding current, cooling of the electrode, shielding gas, arc length (distance A), etc., but can be assumed to be known. This potential P can be accessed as an electrical variable, for example an electrical voltage $U_D$ against a reference potential. In FIG. 3, on the equipotential lines 28, exemplary voltage values are shown against the potential of the workpiece 10 as reference potential. This electrical potential P is tapped via the welding wire 8, which is supplied to the welding point 25 and is therefore in the quasi-static electrical field, and is measured against the reference potential of the workpiece 10 by means of a potential measuring unit 30, for example a voltage measuring device 29. For this purpose, no separate measuring current has to be passed through the welding wire 8. Likewise, a possible heating current for heating the welding wire 8 does not interfere with the detection of the potential P. The potential P can thus be tapped in both cold wire and hot wire applications.

It goes without saying that instead of an electrical voltage $U_D$, an electrical current flowing through the welding wire 8, which is caused by the potential P, can also be measured in an analogous manner. For this purpose, for example, a terminating resistor 34 (FIG. 5) can be connected between the welding wire 8 and the workpiece 10, over which an electrical current flows which can be measured to detect the potential P. In the same way, a different electrical variable related to the potential distribution can be detected or determined, for example a resistance or a power from the voltage $U_D$ and the current. The tapping of the electrical potential P therefore encompasses all these possibilities according to the invention.

The detection of the potential P can take place, for example, in the welding power source 2 by a potential measuring unit 30 (FIG. 1), in which welding power source 2 the reference potential of the workpiece 10 is present anyway, for example via the contact line 9 or a separate line for contacting the workpiece 10. The use of the contact line 9 is advantageous since an additional line can then be dispensed with. When using the contact line 9, the potential measuring unit 30 can be connected to the terminal of the contact line 9 (ground socket) on the welding device 1, for example. It is only necessary to additionally provide the potential measuring unit 30 in the welding device 1 in order to detect an electrical variable representing the electrical potential P, for example an electrical voltage $U_D$. For this purpose, an electrical contact can simply be implemented on the welding wire 8, for example as a sliding contact in the welding wire feed 7. If necessary, a terminating resistor 34, which can also be part of the potential measuring unit 30, can be provided between the welding wire 8 and the workpiece, or the contact line 9, or another reference potential.

By means of the detected potential P, it can be easily recognized, due to the potential distribution established, whether the welding wire 8 touches the workpiece 10 (actually the weld pool 26) or whether the welding wire 8 is too far away from the weld pool 26, in order to thus control the welding wire feed 7 so that an average welding wire feed speed $\bar{v}_D$ is established with which the welding wire 8 is supplied from the welding wire feed 7 to the welding point 25. This principle according to the invention is shown in FIG. 4 on the basis of an exemplary embodiment.

Figure 4:
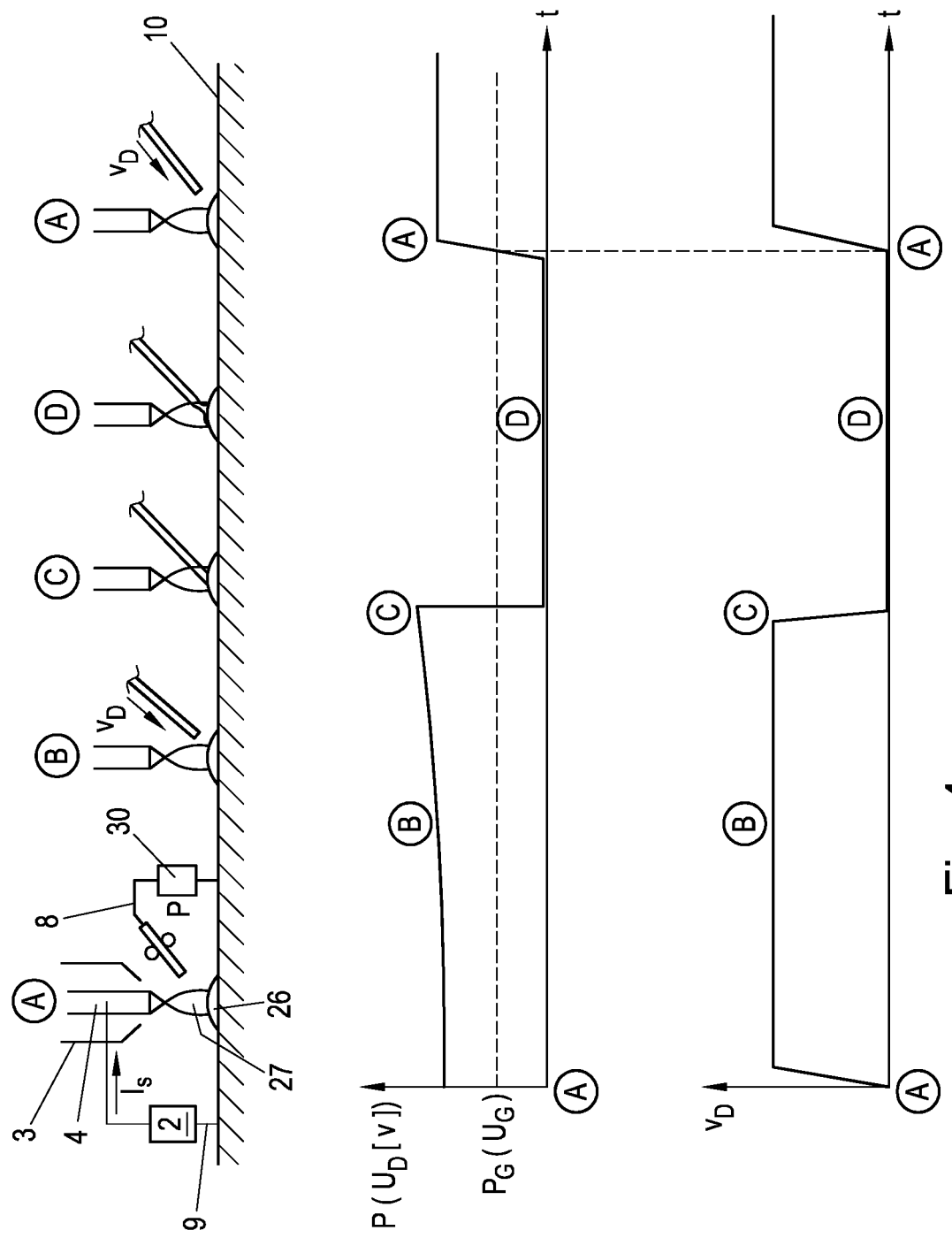
FIG. 4 shows the individual phases of a method according to the invention for feeding the welding wire.

FIG. 4 shows the method according to the invention on the basis of multiple times and phases A to D of a control of the welding wire feed 7 according to the invention. In the diagram therebelow, the tapped potential P is plotted in this embodiment in the form of voltage $U_D$ over time t. The welding wire feed speed $v_D$ is shown in the diagram therebelow over time t. The individual times and phases A-D are also shown in both diagrams.

For carrying out the method according to the invention, the potential P is continuously detected, which includes both continuous detection and time-discrete detection (sampling in specified time steps). The measured potential P is preferably also digitized and digitally processed.

The welding method naturally also requires an ignited arc 27. Before the process starts, the arc 27 is thus ignited, for example by means of a high voltage or by touching/lifting the electrode 4. The end of the welding wire 8 is preferably located outside the arc 27, preferably sufficiently outside the potential field around the electrode 4. No or only a very small potential P is thus detected with the welding wire 8. When the arc 27 is ignited, the welding wire feed 7 can then be started, whereby the welding wire 8 is fed to the arc 27. Therefore, at the start of the process, provision may be made that the welding wire 8 is delivered even though no potential P or only a very low potential P is detected. It may also be the case that a preset time is waited between the ignition of the arc 27 and the start of the welding wire feed 7. When the welding wire 8 is supplied to the arc, the detected potential P, for example an electrical voltage $U_D$ or a current $I_D$, increases. If the detected potential P exceeds a specified limit value $P_G$, for example a limit voltage of 2.5 V in the case of a voltage $U_D$ as potential P, the method according to the invention begins, as described in FIG. 4. It should be noted here that the welding wire feed speed and/or the limit value $P_G$ at the start of the process can have a different value than in the method according to the invention described below. It should also be noted that the process can also be started in other ways.

It would also be possible to provide a high-impedance voltage source in the potential measuring unit 30, with which an electrical voltage can be applied to the welding wire 8. A potential P could thus also be detected before the ignition of the arc 27 and the position of the welding wire 8 relative to the workpiece 10 could be determined from this, in particular in terms of whether there is a short circuit (contact between welding wire 8 and workpiece 10). The high-impedance voltage source can be connected to the welding wire 8 only before welding, but it can also be permanently connected to the welding wire 8.

At time A, the welding wire 8 is supplied to the weld pool 26 at a welding wire feed speed $v_D$, for example at the maximum and/or a specified welding wire feed speed. The welding wire 8 is supplied during a second phase B until the welding wire 8 contacts the workpiece 10 or equally the weld pool 26 (time C), which creates a short circuit between the welding wire 8 and the workpiece 10. At time C, the voltage $U_D$ drops to zero due to the short circuit. If a current were to be detected as potential P, this current would also drop to zero because the electrical potentials of the workpiece 10 and the welding wire 8 are the same when they come into contact and therefore no current can flow. It should be noted at this point that the voltage or the current in the case of a short circuit will not drop completely to zero due to the resistance of the weld pool 26 and the workpiece 10 and the welding current $I_S$ flowing through these resistances, but rather a small residual voltage (typically in the range of <1 V) or a small residual current (typically in the range of a few µA (also depending on the terminating resistor)) would remain, with which a short circuit can nevertheless be clearly detected and which is also understood as "dropping to zero" in the context of the invention.

If a short circuit is recognized via the tapped potential P, the welding wire feed 7 is stopped at time C and the welding wire feed speed $v_D$ is thus set to zero. The stopping can take place with a certain specified speed profile, for example with the maximum possible deceleration of the welding wire feed 7. Thus, at the beginning of phase D, the welding wire end of the welding wire 8 dips to a certain extent (which depends, amongst other things, on the speed profile) into the weld pool 26. The stopped welding wire 8 melts during phase D due to the heat of the arc 27 and the weld pool 26, whereby contact with the weld pool 26 is interrupted after a certain time. The welding wire 8 thus again loses contact with the workpiece 10 (the weld pool 26), as a result of which the short circuit is eliminated and the potential P increases again rapidly. In the case of the voltage $U_D$ as in FIG. 4, the voltage $U_D$ increases rapidly when the welding wire 8 loses contact with the weld pool 26. If the rising potential P, for example the voltage $U_D$, exceeds a set limit value $P_G$, for example a limit voltage $U_G$ of 2.5 V, the welding wire feed 7 begins to supply the welding wire 8 to the welding point 25 again (time A), whereby the welding wire feed speed $v_D$ increases again from zero to a set or specified speed. The start-up of the welding wire feed 7 can also be carried out with a specified speed profile, for example with the maximum possible acceleration of the welding wire feed 7. This cycle of phases A-D for stopping and feeding the welding wire 8 is repeated cyclically during the welding.

If the welding process is to be ended, the wire feed may no longer be started at the end of phase D, i.e., at time A, that is to say the welding wire 8 is no longer be conveyed in the direction of the weld pool 26. For this purpose, the welding wire 8 can also be moved a certain distance backward at time A, i.e. away from the electrode 4 and the arc 27, so that the wire end is not more significantly melted by the possibly still-burning arc 27 and thus no ball can form. The welding current $I_S$ can then be reduced to a low value after a specified ramp and switched off, thus ending the welding process.

In the cyclical course of the welding process, the feed of the welding wire 8 may also not be stopped immediately when a short circuit is detected, but rather only after a specified stop delay time. The dipping depth of the welding wire 8 into the weld pool can thus be influenced. However, it may also be the case that only the finite deceleration of the welding wire feed speed $v_D$ to zero is sufficient for this purpose. Likewise, it may be the case that the feed of the welding wire 8 is not restarted immediately when the limit value $P_G$, time A, is exceeded, but only after a specified start delay time.

It may also be the case that the welding wire feed speed $v_D$ is not reduced to zero at the beginning of phase D, i.e. time C, thus stopping the welding wire 8, but rather a second welding wire feed speed $v_{D2}$ can be set in phase D which is lower than the welding wire feed speed $v_D$. This remaining welding wire feed speed $v_{D2}$ should be so small that the welding wire 8 melts faster than it is being fed. This would extend phase D. The second welding wire feed speed $v_{D2}$ can, however, at least temporarily, also have an opposite sign to the normal welding wire feed so that the welding wire 8 is actively withdrawn from the weld pool 26, preferably at the beginning of phase D. This would shorten phase D. The second welding wire feed speed $v_{D2}$ can also be set only for part of phase D and the welding wire feed speed $v_D$ can be set to zero in the remaining part.

Figure 5:
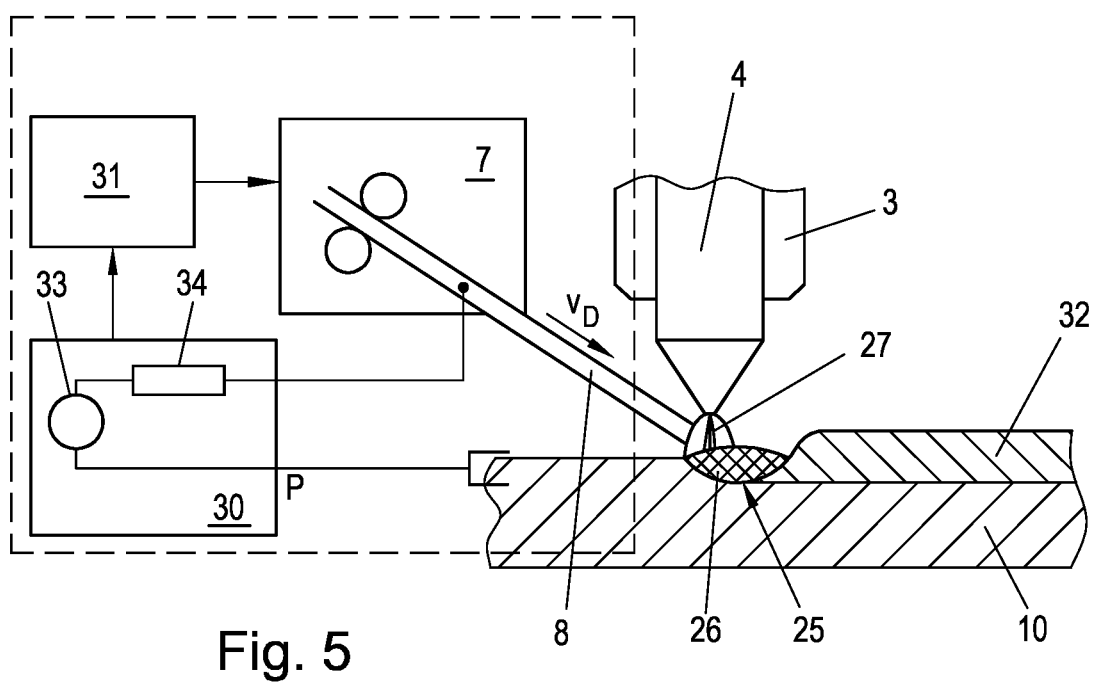
FIG. 5 shows the implementation of the method according to the invention in the welding device.

This method could be implemented as shown in FIG. 5. The potential P around the electrode 4 of the welding torch 3 is tapped with the welding wire 8 and detected in a potential measuring unit 30 (hardware and/or software). The potential measuring unit 30 is designed in this embodiment as a current measuring unit 33 with a terminating resistor 34. The detected potential P is supplied to a feed control unit 31 (hardware and/or software) in which the detected potential P is evaluated in order to identify the individual times and phases A-D. The potential measuring unit 30 and the feed control unit 31 could of course also be implemented in one unit, for example also in the control of the welding device 1. The feed control unit 31 controls the welding wire feed 7, in particular stops it the supply of the welding wire 8 (or changes it to the second welding wire feed speed $v_{D2}$) and starts it as described above. The feed control unit 31 could therefore also be implemented in the welding wire feed 7. The stopping and/or acceleration of the welding wire 8 can be implemented in any desired manner, for example with the greatest possible dynamics (maximum acceleration) or with a certain specified speed profile, whereby different accelerations or speed profiles can of course also be provided for starting and stopping. The mentioned delay times can be adhered to and/or kept to a minimum. The dynamics of the welding wire feed 7 should of course be sufficient to this end. Such a cycle A-D typically lasts 50 to 200 ms, which allows the demands on the dynamics of the welding wire feed 7 to be easily established.

These or at least some parameters for regulating the welding wire feed 7 could also be settable on the welding device 1 and/or on the welding wire feed 7. A suitable user interface and/or input/output interface can be provided for this.

By means of this type of regulation of the welding wire feed 7, an average welding wire feed speed $\bar{v}_D$ is established on the basis of the current welding current $I_S$. In other word, the average welding wire feed speed $\bar{v}_D$ results from the deviations from the set welding wire feed speed $v_D$. The average welding wire feed speed $\bar{v}_D$ can also be a specifiable parameter which specifies the dynamics of the regulation, for example. The cycle frequency is also directly proportional to the welding current $I_S$. This means that the average welding wire feed speed $\bar{v}_D$ does not have to be preset and controlled, but rather there is an automatic adaptation of the average welding wire feed speed $\bar{v}_D$ to the respective welding conditions or the set welding current $I_S$. At the same time, this reliably prevents the welding wire 8 from dipping too deeply into the weld pool 26 and prevents the welding wire 8 from moving too far away from the weld pool 26. The optional delay time from time A can be used to specify how far the welding wire 8 may move away from the weld pool 26.

At the same time, the fill level of the weld seam 32 also adapts automatically. If the electrode 4 is lifted further from the workpiece 10, the position of the end of the welding wire 8 moves closer to the hotter arc center and the wire is melted more quickly, meaning the cycle frequency of the cycle A-D increases. As a result, more welding wire 8 is supplied to the welding point 25, which in turn leads to more material in the weld seam 32. This can also prevent the weld seam from sagging due to insufficient material in the weld seam 32, which adversely affects the quality of the weld. If the weld seam 32 begins to sag, the distance x between the electrode 4 and the workpiece 10 increases, as a result of which the cycle frequency and the average welding wire feed speed $\bar{v}_D$ increases and, in total, more material is supplied to the welding point 25.

However, the distance x between the electrode 4 and the workpiece 10 (FIG. 3) can also be regulated via the cycle frequency that is established and the average welding wire feed speed $\bar{v}_D$ that is established. This is explained with reference to FIG. 6. Here the curve of the voltage $U_D$ and the welding wire feed speed $v_d$ is always the same for a value of the welding current $I_S$, with the cycle frequency and the average welding wire feed speed $\bar{v}_D$ adapting directly proportionally to the distance x.

Figure 6:
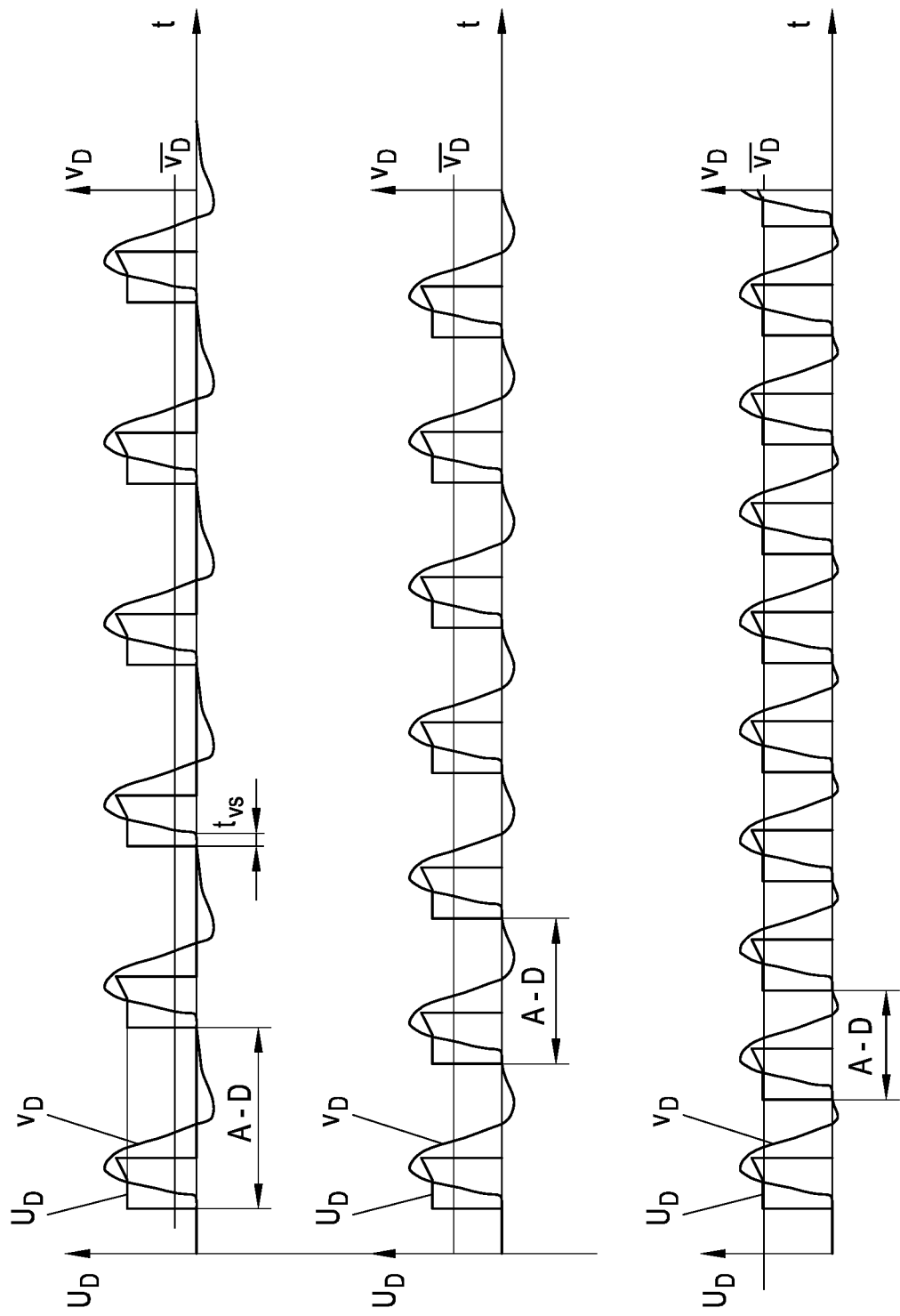
FIG. 6 shows the cycle frequency and average welding wire feed speed which are established at various distances between the electrode and the workpiece and FIG. 7 shows the detection of the arc voltage as a safety means.

The top of FIG. 6 shows the cycle A-D that is established in the case of a small distance x between the electrode 4 and the workpiece 10, for example 2 mm. In this example, the potential P is represented by the voltage $U_D$. It can also be seen that, in this example, the welding wire feed speed $v_D$ briefly changes the sign in phase D, i.e., the welding wire 8 is actively withdrawn or a certain overshoot cannot be prevented due to the inertia of the welding wire feed 7 and/or the regulation of the welding wire feed 7. An intended start delay time $t_{VS}$ can also be seen, in order to start the welding wire feed 7 with a delay. The cycle A-D is repeated here with a cycle frequency of 11.5 Hz, for example, and an average welding wire feed speed $\bar{v}_D$ of 1 m/min is established, for example.

In the middle of FIG. 6, the distance x between the electrode 4 and the workpiece 10 has been increased, for example to 3 mm. The cycle frequency increases to 17.2 Hz and the average welding wire feed speed $\bar{v}_D$ increases to 2 m/min. At the bottom of FIG. 6, the distance x has been increased even further, for example to 4 mm. The cycle frequency increases to 26.2 Hz and the average welding wire feed speed $\bar{v}_D$ increases to 2.7 m/min. The cycle frequency is typically in the range between 2 Hz and 50 Hz, although higher cycle frequencies such as 200 Hz are also possible.

The distance x can therefore be regulated starting from a set distance x by changing a deviation in the cycle frequency and/or the average welding wire feed speed $\bar{v}_D$ in one direction or the other from an initial cycle frequency or an average initial welding wire feed speed with respect to an adjustment of the distance x in one direction or the other, i.e., in the direction of a greater distance or a smaller distance. If there is a deviation, the distance x is thus changed, so that the cycle frequency and the average welding wire feed speed $\bar{v}_D$ change accordingly. From this, a signal can be generated (for example, acoustically for manual welding or a distance correction for automated welding systems) for a distance control for the welding torch and the distance x can also be documented. In this way, the distance x can be kept substantially constant during the welding, or at least kept within a narrow window around the desired distance.

Of course, a particular cycle frequency or a particular average welding wire feed speed $\bar{v}_D$ can also be specified, which correlates with a particular distance x between the electrode 4 and the workpiece 10, and regulation can be used to reach this specified value, whereby the desired distance x is also maintained.

Both the cycle frequency that is established or the average welding wire feed speed $\bar{v}_D$ that is established can be easily determined, for example in the feed control unit 31 or in the control of the welding device 1, and can therefore easily be used to regulate the distance x.

To adjust the distance x between the electrode 4 and the workpiece 10, a suitable but arbitrary actuator can be provided, which is actuated on the basis of a deviation between a desired distance and a current distance in order to change the distance x. For example, the welding torch 3 can be arranged on a robot arm and the robot controller can receive information from the welding device 1 in order to increase or decrease the distance x. The regulation of the distance x could also be implemented in the robot controller itself, however.

In this case, the robot controller would receive a current average welding wire feed speed $\bar{v}_D$ or a current cycle frequency from the welding device 1, for example.

In manual welding, it could be indicated to the welder whether the distance x should be increased or decreased, for example. The indication may be a display or also simply signal lights or an acoustic signal.

Figure 7:
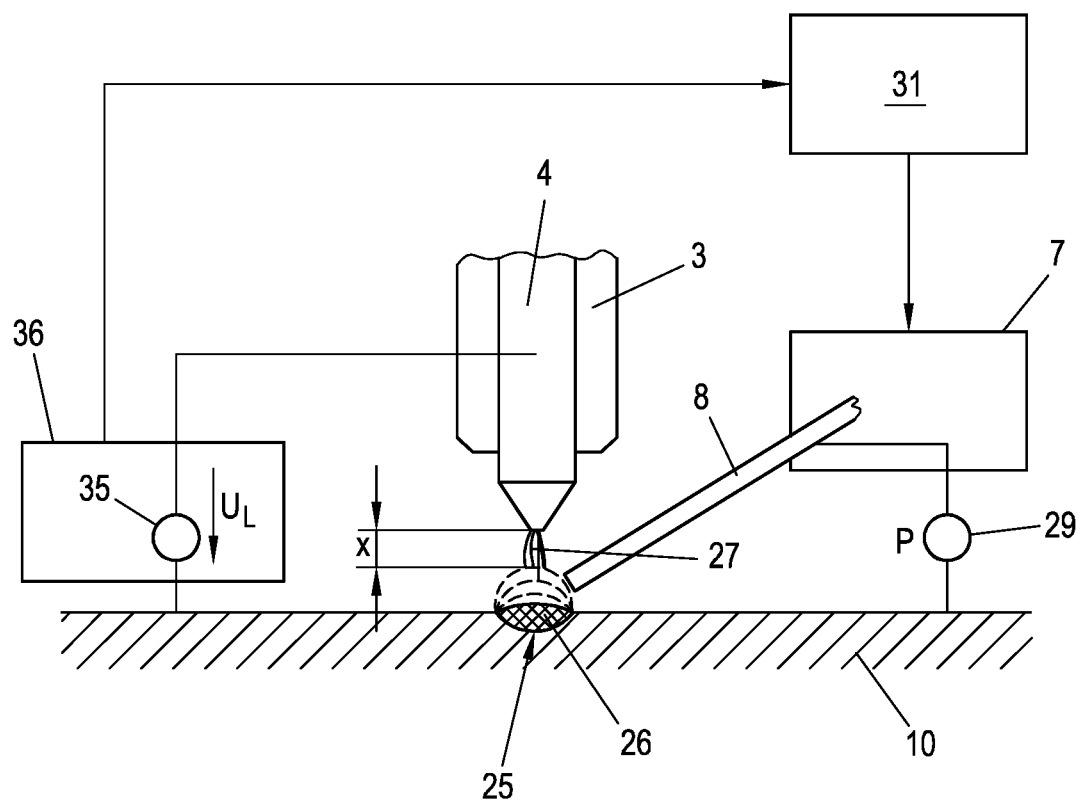

Irrespective of a regulation of the distance x or an adaptation of the average welding wire feed speed $\bar{v}_D$, the distance x between the electrode 4 and the workpiece 10 at the welding point 25 can be monitored, as will be described with reference to FIG. 7. If, for example, the movement of the welding torch 3 is stopped, for example because of a fault, then the welding wire 8 would continue to be supplied as described as long as an arc 27 is burning. This would lead to a filler material being continuously supplied at the welding point 25 and building up locally (dashed lines in FIG. 7). The distance x between the electrode 4 and the welding point 25 (the workpiece) would thus become smaller, which would lead to a reduction in the average welding wire feed speed $\bar{v}_D$, but would not prevent the supply of the welding wire 8.

In the worst case, the electrode 4 could dip into the weld pool 26, which would destroy the electrode 4. Therefore, the arc voltage $U_L$ between the electrode 4 and the workpiece 10 (the weld pool 26) may also be detected. This can be implemented, for example, by means of a simple voltage measurement in the welding current source 2, e.g., with an arc voltage sensor 35. The detected arc voltage $U_L$ can be evaluated in an arc voltage detection unit 36 (hardware and/or software). The arc voltage $U_L$ is continuously detected in analog or digital fashion, with continuous also being understood to mean temporally discrete sampling of the arc voltage $U_L$. When the arc 27 is burning, the smaller the distance x, the smaller the arc voltage $U_L$. A lower limit for the arc voltage can thus be set, for example 8 V. If the voltage falls below this lower limit, the supply of welding wire 8 is stopped. Only when the detected arc voltage rises again above a specified starting voltage, for example 8.2 V, is the supply of welding wire 8 resumed as described above. In order to prevent constant stopping and starting of the welding wire supply, the starting voltage is preferably greater than the limit voltage. For this purpose, the arc voltage detection unit 36 can actuate the feed control unit 31 in order to stop the feed of the welding wire 8. For this purpose, the arc voltage detection unit 36 could also be implemented in the feed control unit 31. The arc voltage detection unit 36 could, however, also actuate the welding wire feed 7 directly.

In order not to stop the welding wire feed each time the voltage falls below the limit voltage for a short time, a sliding average value of the detected arc voltage $U_L$ over a specified period of time can also be determined. In order to stop the welding wire feed, the average value would then have to fall below the limit voltage. And for starting, the average value would preferably have to rise above the starting voltage.

The detection and evaluation of the arc voltage $U_L$ thus serves to increase process reliability.

If the contact line 9 (ground line) is used to detect the potential P, then this can advantageously also be used to continuously detect and monitor the state of the contact line 9. In the case of a short circuit (phase D, FIG. 4), the detected potential P (in the case of a voltage $U_D$) corresponds to the voltage drop between the workpiece 10 and the connection between the potential measuring unit 30 and the contact line 9 in the welding device 1 (for example the terminal of the contact line 9 in the welding device 1) and thus essentially represents the contact line 9. If a resistance is now calculated with the detected voltage $U_D$ (potential P) and the known welding current $I_S$, for example in the feed control unit 31 or another control unit of the welding device 1, this resistance is a measure of the state of the contact line 9. If this resistance is determined during each phase D, or in each x-th (x>1) phase D, the state of the contact line 9 can be monitored. For example, if the resistance increases, it can be concluded that the state of the contact line 9 has deteriorated. For this purpose, a limit resistance can be stored with which the continuously determined resistance is compared. If the resistance exceeds the limit resistance, an error message (e.g., acoustic or visual) can be output, for example on the welding device 1. Of course, the state of a separate line between the workpiece and the potential measuring unit 30 can also be determined and monitored in the same way. This monitoring of the state of the contact line 9 or a separate line is independent of the use of the potential P to control the welding process, in particular independent of the regulation of the welding wire feed speed $v_D$.

The invention claimed is:

1. A welding method using a welding torch having an electrode and using a welding wire that is supplied to a welding point at a welding wire feed speed, said welding method comprising:
    creating an arc to be maintained between the electrode and a workpiece to be welded by way of a welding current flowing through the electrode, said welding current producing a distribution of an electrical potential in the vicinity of the electrode;
    tapping the electrical potential in the vicinity of the electrode with the welding wire;
    controlling the feed speed of the welding wire according to a tapped electrical potential, said controlling resulting in establishing an average welding feed speed; and
    applying, before welding an electrical voltage to the welding wire to detect the electric voltage as the electrical potential before ignition of the arc and to determine a position of the welding wire in relation to the workpiece from the detected electrical potential before the ignition of the arc.

2. The welding method according to claim 1, further comprising:
    the welding wire that is supplied to the welding point comprises supplying the welding wire to the welding point at a first welding wire feed speed until a short circuit between the welding wire and the workpiece is detected via the tapped electrical potential;
    when the short circuit is detected, the supplying of the welding wire to the welding point is stopped or changed to a second welding wire feed speed; and
    when, via the tapped electrical potential and a specified limit value of the electrical potential, a determination is made that the welding wire has stopped and has melted to a certain extent causing an elimination of the short circuit, supplying of the welding wire to the welding point is restarted at the first welding wire feed speed.

3. The welding method according to claim 2, wherein:
    the supplying of the welding wire is started with a specified start delay time and/or the welding wire is stopped with a specified stop delay time.

4. The welding method according to claim 2, wherein: stopping and restarting of the supplying of the welding wire is repeated cyclically during welding.

5. The welding method according to claim 4, wherein:
    a cycle frequency of a cyclical repetition is used to control a desired distance between the electrode and the workpiece.

6. The welding method according to claim 5, wherein:
    starting from a desired distance between the electrode and the workpiece, the desired distance is increased when the cycle frequency decreases and the distance is reduced when the cycle frequency increases.

7. The welding method according to claim 1, wherein:
    the electrical voltage or the electrical current with respect to the electrical potential of the workpiece, or a related electrical variable, is detected as the electrical potential.

8. The welding method according to claim 7, wherein:
    a short circuit is identified when the electrical voltage or the electrical current drops to zero.

9. The welding method according to claim 8, wherein:
    when the supplying of the welding wire is stopped, a value of the electrical voltage or the electrical current rises from zero due to melting of the welding wire, and an associated loss of contact between the welding wire and the workpiece and, with further melting of the welding wire, a specified limit voltage or a specified limit current as a limit value of the electrical potential is reached, whereby the supplying of the welding wire to the welding point is restarted.

10. The welding method according to claim 1, wherein:
    the average welding wire feed speed is used to control a desired distance between the electrode and the workpiece.

11. The welding method according to claim 10, wherein:
    starting from a desired distance between the electrode and the workpiece, the distance is increased when the average welding wire feed speed or a cycle frequency decreases, and the distance is reduced when the average welding wire feed speed or a cycle frequency increases.

12. The welding method according to claim 1, wherein:
    an arc voltage between the electrode and the welding point is detected and the supplying of the welding wire is stopped when the detected arc voltage, or an average value of the arc voltage over a specified period of time, falls below a specified limit voltage.

13. The welding method according to claim 12, wherein:
    the supplying of the welding wire is restarted when the detected arc voltage, or the average value of the arc voltage over the specified period of time, rises above a specified starting voltage.

14. The welding method according to claim 1, wherein:
    during a short circuit between the welding wire and the workpiece, a resistance is determined from the detected electrical potential and the welding current as a measure of a state of a line between an electrical potential measurer for determining the detected electrical potential and the workpiece.

15. A welding device comprising:
    a welding torch having an electrode;
    a welding wire feed configured to supply welding wire at a welding wire feed speed into a region of the electrode of the welding torch;
    for performing welding, a welding current through the electrode causes an arc to burn between the electrode and a workpiece, said welding current causes a distribution of an electrical potential in the vicinity of the electrode;
    an electrical potential measurer is configured to detect, with the welding wire, the electrical potential generated by the welding current in the vicinity of the electrode;

a feed controller configured to evaluate a detected electrical potential and to control a welding wire feed speed via the detected electrical potential so that an average welding wire feed speed is established;

the electrical potential measurer comprises a high-impedance voltage source configured:
- to apply an electrical voltage to the welding wire before welding to detect the electrical voltage as the electrical potential before ignition of the arc; and
- to determine a position of the welding wire in relation to the workpiece from the detected electrical potential before ignition of the arc.

16. The welding device according to claim 15, wherein:
the feed controller is configured to determine a short circuit between the welding wire and the workpiece via the detected electrical potential;
when the short circuit is detected, the feed controller is configured:
- to stop the supply of welding wire at a first welding wire feed speed by the welding wire feed; or
- to change the supply of welding wire to a second welding wire feed speed;

the feed controller is configured to determine, via a tapped electrical potential and a specified limit value of the electrical potential, that the stopped welding wire has melted to a certain extent causing elimination of the short circuit, whereby the feed controller restarts the supply of the welding wire into the region of the electrode.

17. The welding device according to claim 16, wherein:
the feed controller is configured to repeat stopping and restarting and stopping of the supply of the welding wire according to the detected electrical potential cyclically during welding.

18. The welding device according to claim 17, wherein:
the welding device sets a distance between the electrode and the workpiece according to a cycle frequency of a cyclical repetition.

19. The welding device according to claim 15, wherein:
the welding device sets a desired distance between the electrode and the workpiece according to the average welding wire feed speed.

20. The welding device according to claim 19, wherein:
starting from a desired distance, the welding device increases the desired distance between the electrode and the workpiece when the average welding wire feed speed decreases and reduces the distance when the average welding wire feed speed increases.

21. The welding device according to claim 19, wherein:
starting from a desired distance, the welding device increases the desired distance between the electrode and the workpiece when the cycle frequency decreases and reduces the distance when the cycle frequency increases.

22. The welding device according to claim 15, further comprising:
an arc voltage detector configured to detect an arc voltage between the electrode and a welding point and which stops the supply of the welding wire when the detected arc voltage, or an average value of the arc voltage over a specified period of time, falls below a specified limit voltage.

23. The welding device according to claim 22, wherein:
the arc voltage detector is configured to restart the supply of the welding wire when the detected arc voltage, or an average value of the arc voltage over the specified period of time, rises above a specified starting voltage.

* * * * *